United States Patent
Hu et al.

(10) Patent No.: US 6,181,113 B1
(45) Date of Patent: Jan. 30, 2001

(54) HARMONIC RESONANCE CONTROL AND PROTECTION SYSTEM FOR SWITCHED POWER FACTOR CONTROL CAPACITOR DEVICES

(75) Inventors: Yi Hu; Le Tang; Harry G. Mathews, all of Cary, NC (US); Richard E. Tyner, Florence, SC (US)

(73) Assignee: ABB Power T&D Company Inc., Raleigh, NC (US)

( * ) Notice: Under 35 U.S.C. 154(b), the term of this patent shall be extended for 0 days.

(21) Appl. No.: 09/363,426

(22) Filed: Jul. 29, 1999

(51) Int. Cl.$^7$ ........................................ G05F 3/00
(52) U.S. Cl. .................... 323/209; 307/102; 307/98
(58) Field of Search .................... 323/210, 211, 323/209, 205; 307/102, 109, 105, 98

(56) References Cited

U.S. PATENT DOCUMENTS

| | | | |
|---|---|---|---|
| 3,959,719 | 5/1976 | Espelage . | |
| 4,139,723 | 2/1979 | Havas | 13/26 |
| 4,199,804 | 4/1980 | Juhlin | 363/51 |
| 4,317,076 | 2/1982 | Price | 323/210 |
| 4,638,238 | 1/1987 | Gyugyi et al. | 323/211 |
| 4,645,997 | 2/1987 | Whited | 323/211 |
| 4,677,364 | 6/1987 | Williams et al. | 323/210 |
| 4,680,531 | 7/1987 | Rey et al. | 323/206 |
| 4,769,587 | 9/1988 | Pettigrew | 323/209 |
| 5,006,973 | 4/1991 | Turner | 363/34 |
| 5,053,691 | 10/1991 | Wild et al. | 323/211 |
| 5,180,963 | 1/1993 | El-Sharkawi et al. | 323/211 |
| 5,227,713 | 7/1993 | Bowler et al. | 322/58 |
| 5,351,180 | 9/1994 | Brennen et al. | 363/71 |
| 5,367,197 | 11/1994 | Klerfors | 307/105 |
| 5,548,203 | 8/1996 | Kemerer et al. | 323/210 |
| 5,568,042 | 10/1996 | Nyberg et al. | 323/211 |
| 5,652,700 | 7/1997 | Tsai et al. | 363/21 |
| 5,654,625 | 8/1997 | Konstanzer et al. | 323/211 |
| 5,670,864 | 9/1997 | Marx et al. | 323/211 |
| 5,672,956 | 9/1997 | Fukui et al. | 323/210 |
| 5,719,757 | 2/1998 | Beyerlein et al. | 363/34 |
| 5,736,838 | 4/1998 | Dove et al. | 323/211 |
| 5,801,459 | 9/1998 | Ängquist | 307/125 |
| 5,963,021 | * 10/1999 | Rostron et al. | 323/210 |

* cited by examiner

*Primary Examiner*—Shawn Riley
(74) *Attorney, Agent, or Firm*—Woodcock Washburn Kurtz Mackiewicz & Norris LLP

(57) ABSTRACT

A method and system for preventing sustained resonance conditions in a power system involves measuring voltage and current samples on a conductor to which a plurality of controlled capacitors are operatively coupled. The measured voltage and/or current is utilized to identify a resonance condition. The method or system determines whether the resonance condition is due to switching of a controlled capacitor and, if so a corrective switching operation is performed after a first time delay. If the resonance condition is determined not to be due to the switching of a capacitor, then a second switching operation, in which a second controlled capacitor is switched after a second time delay, is performed. The second time delay is preferably greater than the first time delay.

8 Claims, 3 Drawing Sheets

Industrial load

Large industrial drive load

SC1: 900 kVAR, Switched
SC2: 600 kVAR, Fixed
SC3: 1,200 kVAR, Switched

HARMONIC RESONANCE CONTROL AND PROTECTION SYSTEM FOR SWITCHED POWER FACTOR CONTROL CAPACITOR DEVICES

FIELD OF THE INVENTION

The present invention relates generally to power transmission and distribution systems, and more particularly to an efficient and reliable system for avoiding sustained resonance conditions in circuits employing power capacitors.

BACKGROUND OF THE INVENTION

This invention relates to a resonance control and protection method and system for use in connection with a controllable power capacitor device. A controllable power capacitor device typically includes one or more power capacitor banks and a programmable control unit. It is known that resonance conditions can be created when such devices are utilized in applied power transmission and distribution circuits. Such resonance conditions may be due, e.g., to capacitor switching and/or system changes. The present invention seeks to provide a mechanism for detecting and remedying resonance conditions in power transmission and distribution systems. A further goal of the invention is to eliminate or alleviate the need for costly and complicated system studies, which are conventionally required when using power capacitor devices, and to simplify the design and application of controllable power capacitor devices.

Capacitor banks have been widely applied by utilities and customers with industrial distribution systems, both to provide voltage support and to improve the power factor of a load. Such capacitor banks are switched in and out of circuits as the demand for capacitive VAR compensation of the load fluctuates. There are also other devices, such as filters, etc., in industrial distribution systems that include power capacitors.

A resonance oscillation can occur in any circuit containing inductors and capacitors. For the simplest L-C circuit, shown in FIG. 1, closing the switch will cause the circuit to oscillate at its natural resonance frequency (f) determined by:

$$f = \frac{1}{2\pi\sqrt{LC}}$$

A practical power circuit usually includes multiple inductive and capacitive devices, and therefore the circuit can be resonant at multiple frequencies. A resonant oscillation in a practical circuit caused by a switching operation may not be sustained for a long period due to the losses in the circuit. However, the oscillation in the circuit could be sustained if harmonic sources are present in the circuit and one of the circuit resonant frequencies becomes the same as one of the harmonic source frequencies. Such a sustained harmonic resonance may cause significant harmonic distortion in the system voltages and currents, which may increase the losses in the circuit and cause damage to equipment operating in the system due to overheating and vibration.

Capacitor switching changes the topology of a circuit, which may tune the circuit to a resonance condition. This may result in sustained resonance oscillations in the circuit if one of the circuit frequencies is tuned to one of the harmonic source frequencies. The harmonic resonance could occur when a capacitor bank is switched into the circuit or when it is switched out of the circuit. FIGS. 2, 3 and 4 depicts waveforms exhibiting such resonance conditions. In FIGS. 2 and 3, energizing the capacitor results in a harmonic resonance, while in FIG. 4 switching off (de-energizing) the capacitor causes harmonic resonance to occur.

The waveforms depicted in FIGS. 2–4 were obtained from a simulated industrial distribution system of the kind shown in FIG. 5. The system of FIG. 5 includes a plurality of buses (numbered 1 through 9), loads and capacitors (denoted SC1, SC2 and SC3). The waveforms of FIGS. 2–4 were obtained when capacitor SC3 at bus 9 was switched on and off. It should be noted that the resonance oscillation could also be caused by other changes in the system, such as switching a circuit in or out of service, etc.

The most common solution to the resonance problem in the past has been to carefully design the parameters of the capacitor(s) to ensure that the circuit resonance frequencies stay away from the harmonic source frequencies. This usually requires a system study to be conducted for each power capacitor application. Other examples of prior art are cited in the Information Disclosure Statement filed herewith.

SUMMARY OF THE INVENTION

The present invention is based on the recognition that a resonance condition can be de-tuned by properly switching the capacitors in a controllable power capacitor device. A control/protection system is provided by the invention for use in controllable power capacitor devices to overcome the above described resonance problem.

The present invention provides a method for preventing sustained resonance conditions in a power system. The inventive method involves the step of measuring voltage and current samples on a conductor to which a plurality of controlled capacitors are operatively coupled. The measured voltage and/or current is utilized to identify a resonance condition. The invention determines whether the resonance condition is due to switching of a controlled capacitor and, if so, a corrective switching operation (e.g., switching on or switching off a capacitance) is performed after a first time delay. If the resonance condition is determined not to be due to the switching of a capacitor, then the invention performs a capacitor switching operation after a second time delay. According to the invention, the second time delay is greater than the first time delay. For example, the first time delay may be approximately one cycle or more and the second time delay may be approximately three cycles or more.

Other aspects of the present invention are described below.

DETAILED DESCRIPTION OF PREFERRED EMBODIMENTS

Figure 1:
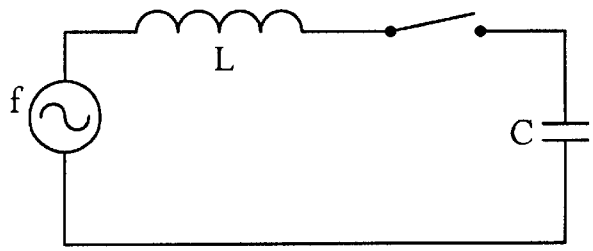
FIG. 1 schematically depicts one example of a resonant circuit.
Figure 6:
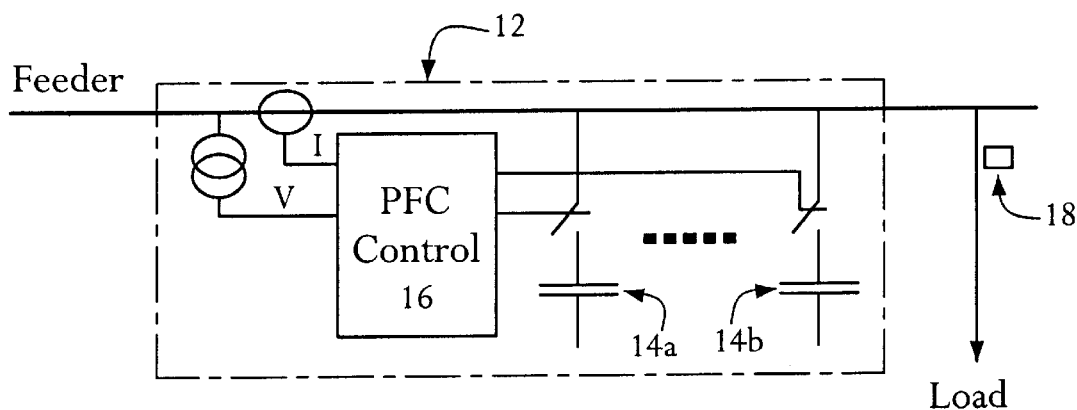
FIG. 6 schematically depicts one example of a configuration of a power factor control (PFC) device.

As mentioned, FIG. 6 illustrates an exemplary configuration of a power factor control (PFC) device 12 As shown, a controllable power capacitor device includes breaker switched capacitor banks 14a and 14b along with an intelligent control unit 16. The capacitor banks are switched in or out to adjust the load 18 power factor or the node voltage as close as possible to targeted values. The intelligent control unit 16 calculates the node voltage and/or actual power factor based on the measured voltage and current (obtained with voltage and current transformers, respectively), and controls the capacitor bank switching operations.

The PFC control unit 16 measures voltage (V) and current flow (I) into the device including the load (it may also measure current flow into the load and each capacitor bank separately). Total harmonic distortion (THD) and/or full spectrum analysis of the measured signals is performed and the change of these values before and after the capacitor switching operation is also computed. When these values exceed preset levels, a resonance condition and/or excessive harmonic distortion condition is declared. The resonance detection signals may be generated for each phase in a three-phase system. The signals are used in conjunction with other signals to determine the proper action to be taken. Since a resonance condition may be caused either by a controllable power capacitor device's own switching operation or by other system changes, different actions should be taken depending on the cause of the resonance.

Figure 7:
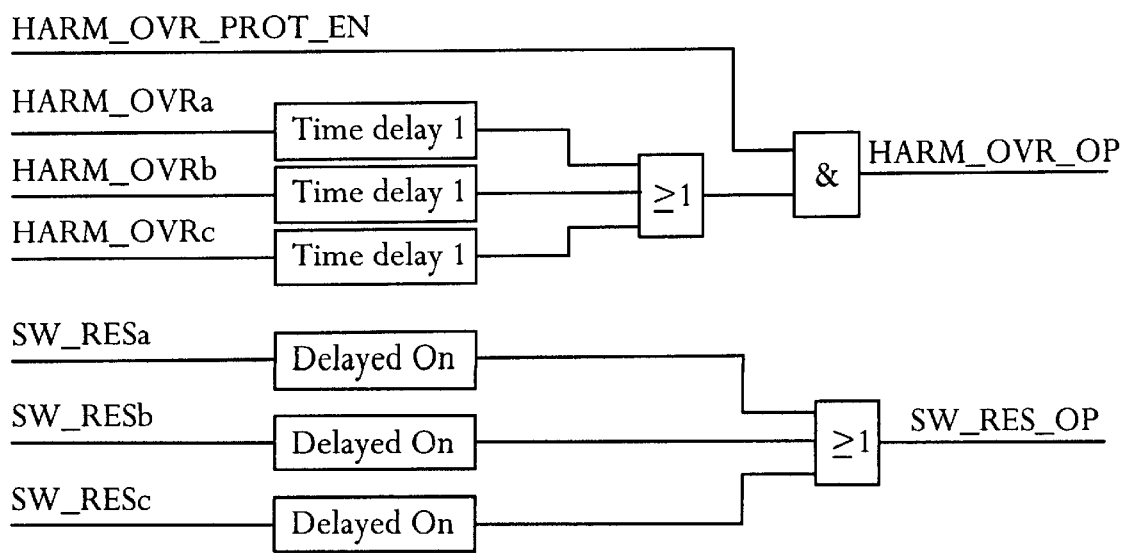
FIG. 7 schematically depicts a presently preferred implementation of control and protection logic in accordance with the present invention.
Figure 2:
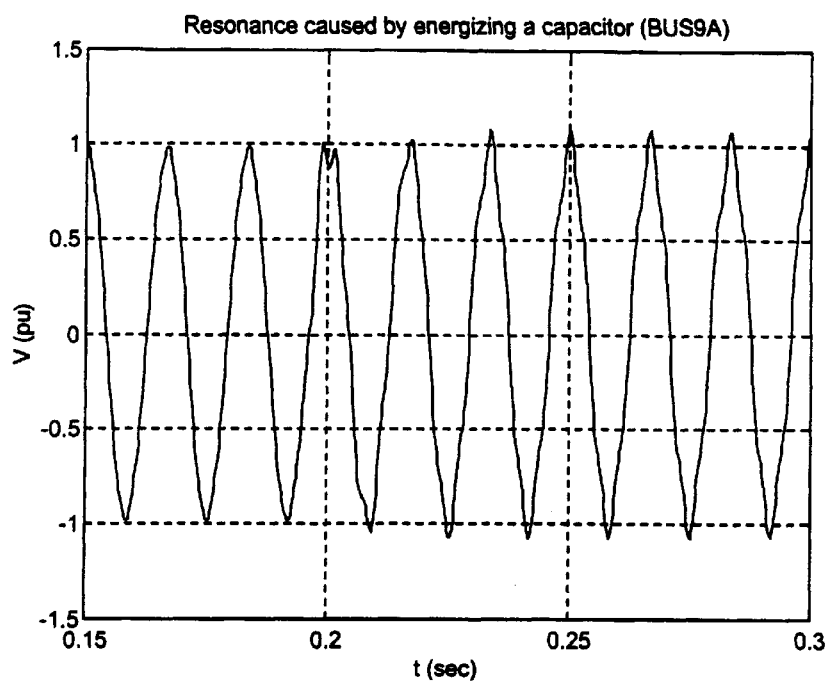
FIGS. 2–4 depict exemplary voltage (FIGS. 2 and 4) and current (FIG. 3) waveforms exhibiting resonance conditions caused by switching a capacitor particularly capacitor SC3 in FIG. 5).
Figure 3:
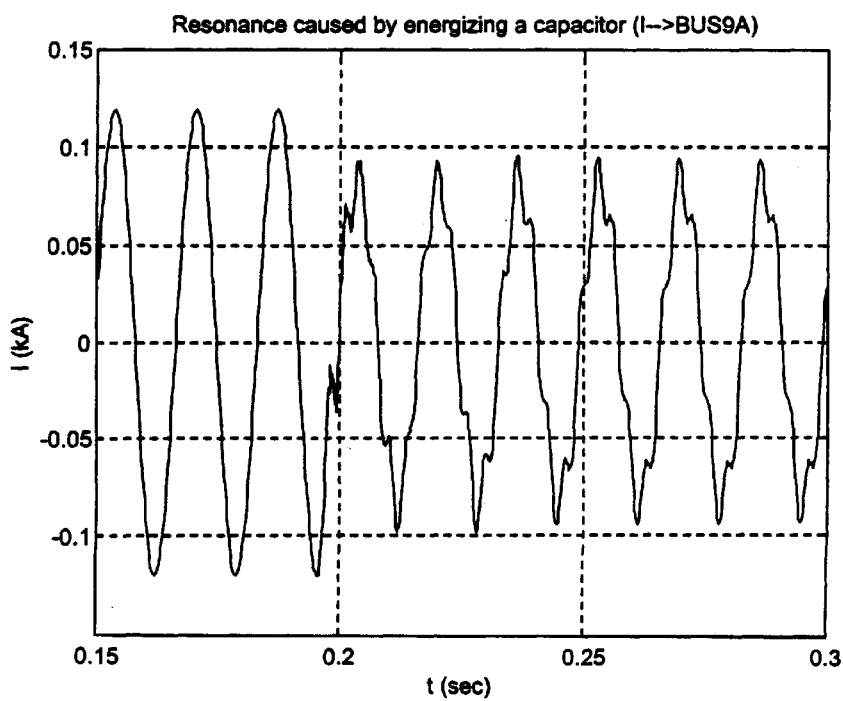
Figure 4:
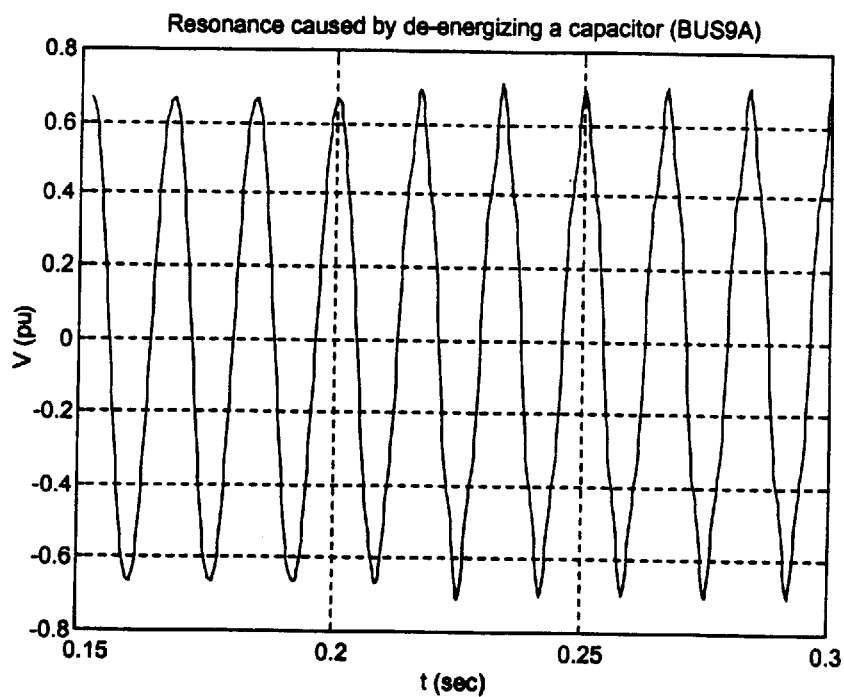
Figure 5:
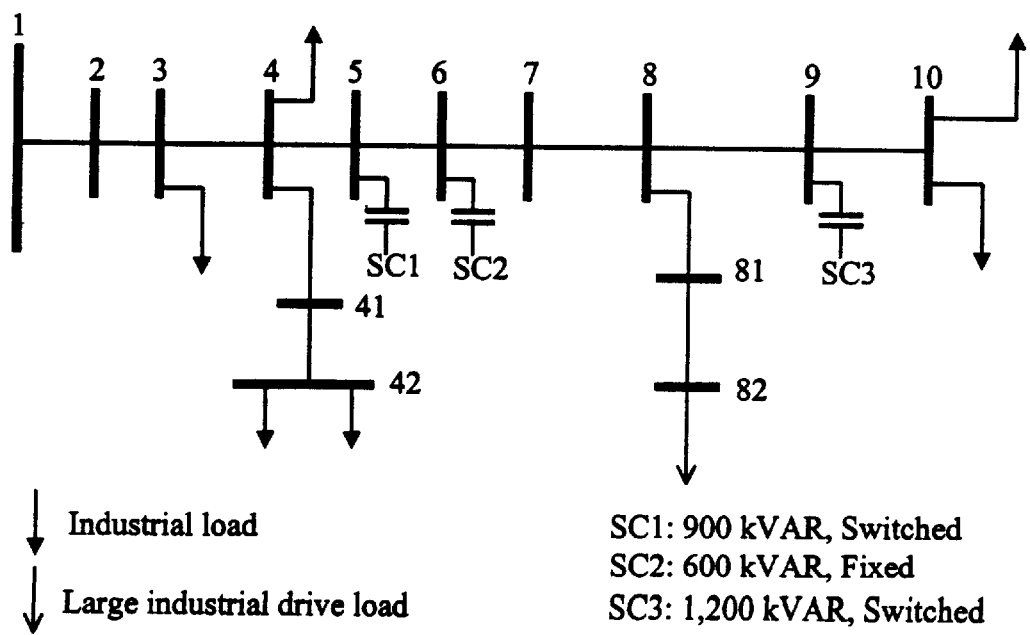
FIG. 5 schematically depicts an exemplary power system containing switched and fixed capacitors.

FIG. 7 illustrates a presently preferred implementation of control/protection logic circuitry in accordance with the present invention. In FIG. 7, the signals denoted SW_RESx (where x represents a, b or c, corresponding to the three phases of a three-phase system) indicate, when active or high, that a resonance condition is detected immediately after the capacitor switching operation, while the signals denoted HARM_OVRx indicate that an excessive harmonic distortion condition (which could be a resonance condition caused by the changes on the system) is detected without any capacitor switching operation (i.e., the condition is not caused by operation of the capacitor). For the SW_RESx condition, a quick corrective switching operation (e.g., switch off a capacitor if its switch-on operation caused the problem, and vice versa) should be sufficient to remedy the situation. The operation signal denoted SW_RES_OP, which initiates the corrective switching operation, is generated after a predetermined short time delay (about one cycle) to avoid false detection due to capacitor switching transients. The signal denoted HARM_OVR_OP is generated after a longer time delay. The time delay is user-selectable, and should be longer than the first time delay to allow time for other controllable power capacitor devices to remedy problems caused by themselves and should allow a coordinated operation of all controllable power capacitor devices in a distribution system (e.g., they should not be operated at the same time and should not be operated in a conflicting manner (either all switched off or on)).

It should be noted that the HARM_OVR_PROT_EN signal is settable by the user to enable or disable the HARM_OVR_OP signal output by the AND circuit in FIG. 7. Moreover, the circuit of FIG. 7 may be implemented as part of the PFC control circuit 16 of FIG. 6. The PFC control circuit 16 preferably also includes circuitry for computing the total harmonic distortion for each phase as well as the harmonic level change. This circuitry would provide the HARM_OVRx and SW_RESx signals input to the FIG. 7 circuit.

The above description of presently preferred embodiments of the invention is not intended to imply that other embodiments or applications of the invention are not within the scope of protection of the following claims. Those skilled in the art of power transmission and distribution will recognize that alternative embodiments and applications within the true spirit of the invention are possible. For example, a communication mechanism may be added to form a coordinated harmonic resonance protection system comprising a plurality of PFC control circuits at different locations that operate in a coordinated fashion.

We claim:
1. A method for preventing sustained harmonic resonance conditions in a power system, comprising:
    (a) measuring voltage and current samples on a conductor to which a plurality of controlled capacitors are operatively coupled, wherein the conductor is part of a circuit and the controlled capacitors are switchable into and out of the circuit;
    (b) identifying a harmonic resonance condition based on at least one of the measured voltage or current;
    (c) determining whether the harmonic resonance condition is due to switching of a controlled capacitor into or out of the circuit; and
    (d) if the harmonic resonance condition is determined to be due to the switching of a capacitor into or out of the circuit, then performing a corrective switching operation after a first time delay; and
    (e) if the harmonic resonance condition is determined not to be due to the switching of a capacitor into or out of the circuit, then performing a capacitor switching operation in which a second controlled capacitor is switched into or out of the circuit after a second time delay, wherein the second time delay is greater than the first time delay;
    whereby sustained harmonic resonance conditions are avoided.

2. A method as recited in claim 1, wherein the first time delay is at least approximately one cycle.

3. A method as recited in claim 1, wherein the second time delay is larger than the first time delay.

4. A system for preventing sustained harmonic resonance conditions in a power system, comprising:
    voltage and current transformers for measuring voltage and current samples, respectively, on a conductor to which a plurality of controlled capacitors are operatively coupled, wherein the conductor is part of a circuit and the controlled capacitors are switchable into and out of the circuit;
    a control processor operatively coupled to the voltage and current transformer and to the controlled capacitors, wherein the control processor is programmed to perform the following process: (1) identify a harmonic resonance condition based on at least one of the measured voltage or current; (2) determine whether the harmonic resonance condition is due to switching of a controlled capacitor into or out of the circuit; and (3) if the harmonic resonance condition is determined to be due to the switching of a capacitor into or out of the circuit, then performing a corrective switching operation after a first time delay; and (4) if the harmonic resonance condition is determined not to be due to the switching of a capacitor into or out of the circuit, then performing a capacitor switching operation in which a second controlled capacitor is switched into or out of the circuit after a second time delay, wherein the second time delay is greater than the first time delay.

5. A system as recited in claim 4, wherein the first time delay is least approximately one cycle.

6. A system as recited in claim 4, wherein the second time delay is larger than the first time delay.

7. A method for preventing sustained harmonic resonance conditions in a power system, comprising:
- (a) measuring voltage and current samples on a conductor to which a plurality of controlled capacitors are operatively coupled, wherein the conductor is part of a circuit and the controlled capacitors are switchable into and out of the circuit;
- (b) identifying a harmonic resonance condition based on at least one of the measured voltage or current;
- (c) determining whether the harmonic resonance condition is due to switching of a controlled capacitor into or out of the circuit; and
- (d) if the harmonic resonance condition is determined to be due to the switching of a capacitor into or out of the circuit, then performing a corrective switching operation after a first time delay, wherein the first time delay is at least approximately one cycle;

whereby sustained harmonic resonance conditions are avoided.

8. A method as recited in claim 7, further comprising:
- (a) if the resonance condition is determined not to be due to the switching of a capacitor into or out of the circuit, then performing a capacitor switching operation in which a second controlled capacitor is switched into or out of the circuit after a second time delay, wherein the second time delay is greater than the first time delay.

* * * * *